(12) United States Patent
Nino

(10) Patent No.: US 7,409,933 B2
(45) Date of Patent: Aug. 12, 2008

(54) TWO CYCLE INTERNAL COMBUSTION ENGINE WITH DIRECT FUEL INJECTION COMBUSTION SYSTEM

(76) Inventor: Enrico Nino, Via G. Mazzini, 17, I-85100 Potenza PZ (IT)

( * ) Notice: Subject to any disclaimer, the term of this patent is extended or adjusted under 35 U.S.C. 154(b) by 137 days.

(21) Appl. No.: 10/558,261

(22) PCT Filed: May 21, 2004

(86) PCT No.: PCT/EP2004/005556

§ 371 (c)(1),
(2), (4) Date: Nov. 21, 2005

(87) PCT Pub. No.: WO2004/106714

PCT Pub. Date: Dec. 9, 2004

(65) Prior Publication Data

US 2007/0051327 A1    Mar. 8, 2007

(30) Foreign Application Priority Data

May 29, 2003    (IT) ............................ PZ2003A0001

(51) Int. Cl.
*F02M 69/04*    (2006.01)
(52) U.S. Cl. .................... 123/65 R; 123/73 C
(58) Field of Classification Search ................ 123/305, 123/65 R, 73 C, 73 V, 196 R, 73 AD
See application file for complete search history.

(56) References Cited

U.S. PATENT DOCUMENTS 3,931,812 A * 1/1976 Ashfield et al. ............ 123/73 S (Continued)

FOREIGN PATENT DOCUMENTS

EP    0 742 366    11/1996

(Continued)

*Primary Examiner*—Stephen K. Cronin
*Assistant Examiner*—Hyder Ali
(74) *Attorney, Agent, or Firm*—Wenderoth, Lind & Ponack, L.L.P.

(57) ABSTRACT

A two-cycle internal combustion engine is of the type having one cylinder (2), one piston (4) with connecting rod, one head (3) closing the cylinder (2) on the explosion chamber side, one crankcase (12) closing the cylinder (2) on the side opposite the explosion chamber, one spark plug (5) inserted in the head, and one burnt gas exhaust pipe (8) with inlet port opening onto the internal surface of the cylinder (2) near bottom dead center of the piston (4). One air input duct (6) with combustion chamber inlet ports (13) is located near bottom dead center of the piston (4) and inlet ports are located either in the cylinder (2) near the crankcase (12) or in the crankcase. One duct (7) lets lubrication oil into the air input duct (6) and one sensor (9) senses rotation speed and angular position of the drive shaft. One fuel injector (1) is inserted in the cylinder wall (2) with an inclination such that the fuel jet produced thereby penetrates into the combustion chamber and impacts on the wall of the head (3) near the spark plug (5) and at a position such that the piston (4), at its top dead center, is placed between the injector (1) and the combustion chamber. A control unit (10), based on the signals output by the sensor (9), synchronizes the cyclic movement of the drive shaft with the sparking times of the spark plug (5) and the opening time of the injector (1), and also regulates the quantity of fuel injected upon each cycle of the engine based on rotation speed, engine load and accelerator regulation set by the user.

7 Claims, 2 Drawing Sheets

Figure 1:
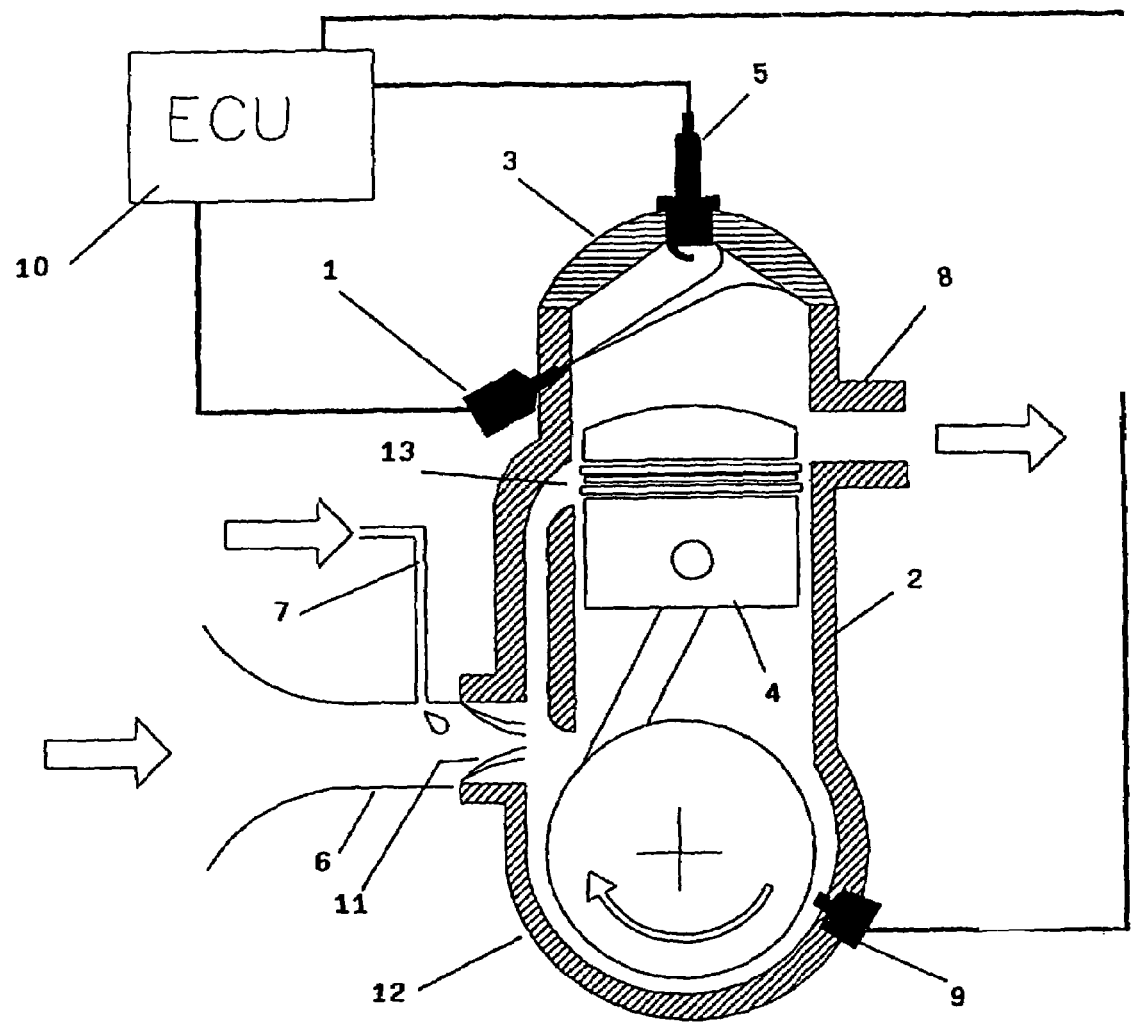

U.S. PATENT DOCUMENTS 4,694,786 A     9/1987   Bilek et al.
4,970,996 A * 11/1990   Matsuo et al. ............ 123/73 V
5,775,289 A     7/1998   Yoshida et al.

FOREIGN PATENT DOCUMENTS

WO           98/53191     11/1998

* cited by examiner

TWO CYCLE INTERNAL COMBUSTION ENGINE WITH DIRECT FUEL INJECTION COMBUSTION SYSTEM

The present invention relates to a two-cycle internal combustion engine with direct fuel injection combustion system.

BACKGROUND

The reciprocating internal-combustion engine of the two-cycle type is universally recognized as the simplest engine of those at present available. This has led to its almost universal adoption in the field of propulsion designed for small vehicles consisting of motorbikes and scooters with piston displacement between 50 cc and 125 cc in addition to so-called quadricycles with engine and a whole series of small tools and devices such as generating sets, chain saws, lawnmowers, outboard engines for aquatic use et cetera. The need for adoption of propulsion systems with 'simple' construction layout is required by the fact that they are low-value-added articles and therefore the industrial cost of propulsion systems as well as of the other components must be kept as low as possible. Other influencing factors are low weight (high power/weight ratio) and the limited maintenance they need.

DRAWBACKS OF THE PRIOR ART

Although simple and low in cost, the two-cycle engine has a series of well known drawbacks consisting essentially of the high degree of overlapping of the intake and exhaust phases. In practice, as well known, for many crank angles both the fresh charge intake and the burnt gas exhaust port are open, with the resulting escape of a considerable part of the fresh charge being estimated at over 40%. This leads to a high percentage of unburnt hydrocarbons in the exhaust fumes such as to make it hardly suited to overcoming the present and soon to be adopted 'antipollution' standards.

Another important cause of pollutant production consists of the lubrication method based on mixing of the lubricant with the fuel.

This method means that once the gasoline is evaporated, the lubricant forms a cloud of very fine droplets such as to be entrained together with the fresh charge into the combustion chamber, and in good percentage directly to the exhaust, with resulting smoke production (incomplete combustion of the oil), fouling of the exhaust pipes and clogging of the muffler. This phenomenon is further worsened by the fact that the lubricant introduced being diluted by the fuel reduces its effectiveness and therefore it is necessary to keep its concentration high in the gasoline.

As described, the drawbacks are caused by the type of feeding based on mixing of the fuel with air before the air enters the combustion chamber. Various attempts have been made to reduce the above-mentioned drawbacks, generally inspired by the inlet of fuel directly into the combustion chamber. This was on the example of large two-cycle diesel propulsion systems but, contrary to diesel propulsion systems, the drawbacks are considerable and consist essentially of the difficulty met with in mixing the fuel with the comburent with resulting anomalous combustion and anomalies of operation. Actually, in two- and four-cycle diesel propulsion systems the problem of mixing the fuel with the comburent is solved by means of an accurate design of the inlet ducts and the combustion chamber—of high swirl and turbulence—and especially by means of very sophisticated injection systems capable of operating at very high pressures, even on the order of 1000 bar in purely mechanical systems, or higher in the so-called 'common rail' systems. With such a level of fuel injection pressure the fuel is dispersed in drops so small (very high fuel atomization) as to be able to mix completely with the fresh air charge in very short time. Such high pressures can be achieved only with diesel oil given its high lubricating power (high viscosity). With gasoline free of lubricating power (low viscosity) this is not possible because it would cause gripping (direct metal-to-metal contact) of the pressurizing systems (pump) and injectors.

Among the various attempts made to overcome these drawbacks, the only one that achieved positive results was the one developed by Orbital Engine Corp. Ltd. which, by adopting a particularly sophisticated injection technique, succeeded in developing two-cycle propulsion systems for automobile use with satisfactory performance, i.e. pollution emissions comparable to those of four-cycle propulsion systems. In actual fact, Orbital Engine developed and perfected an injection technique called 'Air Assisted Injection' assisted by compressed air at relatively low pressure on the order of magnitude of 10 bar capable of increasing atomization of the fuel (reduction of average diameter of the drops produced and termed also Sauter Mean Diameter (SMD)). Orbital Engine achieved realization of low SMD fuel spray by utilizing the expansive ability of compressed gasses (air) to convey the liquid fuel and give it the energy necessary for its dispersion, i.e. energy which in purely mechanical injection systems is supplied by the above-mentioned high pressure injection. With this type of injection system, Orbital Engine was able to develop two-cycle propulsion systems for automobile use capable of performance comparable to that of four-cycle propulsion systems primarily from the pollution emissions viewpoint.

Orbital Engine recently applied its technique to a two-cycle engine with 50 cc piston displacement. The product developed displays particular reductions both in fuel and lubricating oil consumption and in emission of pollutants. These results, while interesting, were achieved by adopting contrivances which considerably complicated the basic layout (suffice it to think of having to adopt a volumetric compressor to produce compressed air on a 50 cc engine). Indeed, the technique adopted provides, in addition to the volumetric compressor, no less than two 'injectors', the true one for gasoline injection into a pre-mixing chamber and one that puts the mixing chamber in communication with the combustion chamber. Both the 'valves' are to be managed by means of a control unit. This shows the considerable level of technical complication reached with resulting increase in production and maintenance costs so that the 'Orbital' solutions are scarcely usable on scooter propulsion systems, which are known for their low value added.

The solution to be adopted for this class of propulsion systems must necessarily be very low in cost (limited value added of the entire propulsion system) and capable of considerably improving the 'performance' of the propulsion system in terms of limited pollutants such as to make it compatible with the requirements of present laws and for the near future.

OBJECTS OF THE INVENTION

The general purpose of the present invention is to remedy the above mentioned shortcomings by making available a two-cycle internal combustion engine displaying, in comparison with conventional two-cycle engines, at least one of the following advantages:

fairly limited amount of unburnt hydrocarbons at exhaust,
considerably reduced consumption of fuel and lubricating oil for equal power,
fairly limited cost, and
limited need for maintenance.

SUMMARY OF THE INVENTION

The present invention allows these advantages by the adoption of a purely mechanical modality of direct fuel injection into the combustion chamber by providing a low or very low cost injection device.

The realization of such a device calls for the adoption of commercial automobile injectors whose great produced quantities ensure low industrial cost.

In particular, the two-cycle internal combustion engine in accordance with the present invention is of a type comprising the following:
one cylinder (2),
one piston (4) with associated connecting rod,
one head (3) closing the cylinder (2) on the explosion chamber side,
one crankcase (12) closing the cylinder (2) on the side opposite the explosion chamber,
a spark plug (5) inserted in the head, and
a burnt gas exhaust pipe (8) with inlet port opening onto the internal surface of the cylinder (2) near bottom dead center of the piston (4). The engine further has the presence in combination the following:
an air input duct (6) with combustion chamber inlet ports (13) located near bottom dead center of the piston (4), and with other inlet ports located either in the cylinder (2) near the crankcase (12) or in the crankcase,
a duct (7) for inlet of lubrication oil into the air input duct (6),
a sensor (9) of rotation speed and angular position of the drive shaft,
a fuel injector (1) inserted in the cylinder wall (2) with an inclination such that a fuel jet produced thereby penetrates into the combustion chamber and impacts on the wall of the head (3) near the spark plug (5) and also inserted at a position such that the piston (4), at top dead center, is placed between the injector (1) and the combustion chamber, and
a control unit (10) which synchronizes the cyclic movement of the drive shaft with the sparking times of the spark plug (5) and opening time of the injector (1) depending on the signals output of the above sensor (9), and also regulates the quantity of fuel injected upon each cycle of the engine depending on rotation speed, engine load and accelerator regulation set by the user.

GENERAL DESCRIPTION OF THE DRAWINGS

Figure 2:
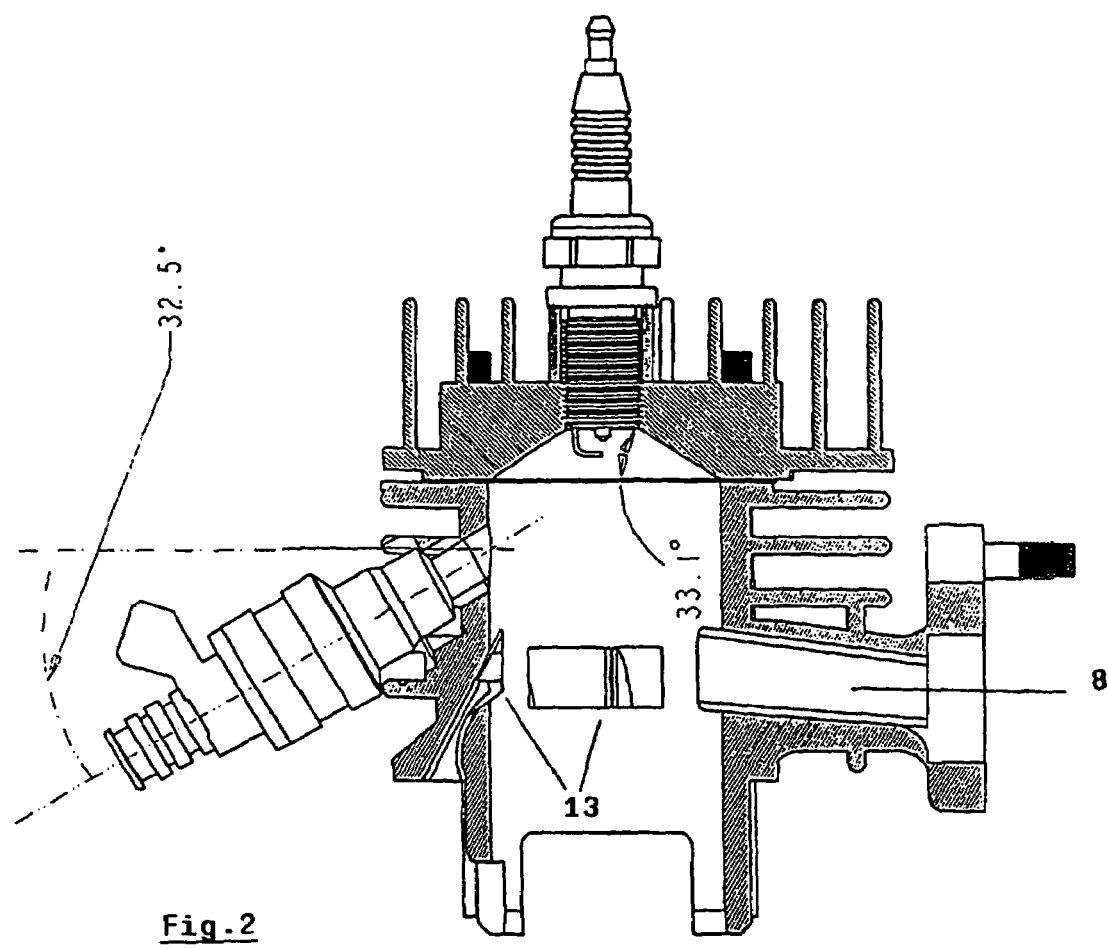
Figure 3:
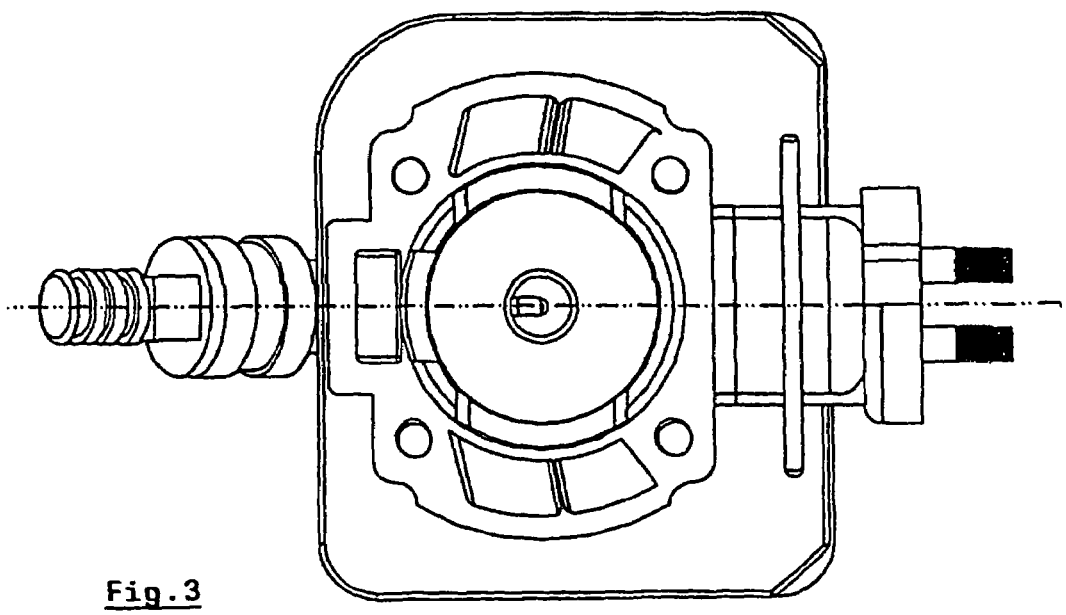

To better clarify the purposes and characteristics of the device in accordance with the present invention, an exemplifying embodiment thereof is described below and illustrated in the annexed drawings, in which:

FIG. 1 shows a diagrammatic cross-sectional view of a two-cycle engine with direct fuel injection combustion system in accordance with the present invention, FIG. 2 shows a cross-sectional view of an engine (upper part) realized in accordance with the diagram of FIG. 1, and FIG. 3 shows a bottom view of the engine of FIG. 2.

PREFERRED EMBODIMENTS OF THE INVENTION

With reference to the figures, in the engine of FIG. 1 the various parts have the following meaning.
1: injector,
2: two-cycle reciprocating engine cylinder,
3: head of the same engine,
4: piston and associated connecting rod,
5: spark plug
6: air inlet duct (without butterfly- or gate valve),
7: lubricating oil input duct,
8: exhaust duct,
9: rpm/drive-shaft position sensor (pick-up),
10: Electronic Control Unit for injector and spark plug synchronization,
11: one-way blade-valve for one-way air flow, and
12: engine crank-case (sump)

In the proposed diagram, for greater clarity in describing the present invention, the part concerning the fuel pressurization system and the lubrication system, both realized with known means, is omitted.

The cross sectional view of the embodiment example of FIG. 2 shows the preferred angles (not binding) of inclination of the injector and of the walls of the head adopted on a prototype (in the figure the entrance 13 of the air input duct and the entrance of the duct 8 seem to protrude into the combustion chamber, contrary to reality, this being only an optical effect).

Operation of the present invention in accordance with the principles of the present invention is as follows: fuel is injected by means of injector (1) into the cylinder (2) when the piston (4) has just closed the scavenging ports (13) (air input). Under these conditions the fuel sprayed by (1) meets a still low pressure inside the cylinder and the combustion chamber and therefore requires low pressure to be injected. The jet produced penetrates into the combustion chamber and impacts against the combustion chamber wall located on the head (3) near the spark plug (5). That is, the head (3), as can be seen from FIG. 1, has a wall surface adjacent the spark plug (5). The injector (1) is positioned to direct the jet of fuel against the wall adjacent the spark plug. After impact, two combined effects take place. The first is activation of the so-called secondary atomization consisting of the drops of fuel which, after impact of the main jet on the solid walls, separate therefrom to be dispersed in the combustion chamber. The second effect is that the impinging jets realize high convective thermal exchange coefficients between fluids and solids and therefore the fuel jet impacting on the walls of the head (known to be between higher temperature components of an endothermic engine) receives an amount of heat such as to raise the enthalpy content and favor rapid vaporization of the fuel. These effects, together with long stay-time of the fuel in the combustion chamber (injection being effected during the first compression strokes), with the tapered form of the combustion chamber and with the central position of the spark plug located near the zone of impact, ensure inflammability of the mixture at all engine operating speeds. In this manner, engine regulation is achieved just by regulating the quantity of fuel injected (and obviously even the injection and ignition phases) depending on rotation speed and engine load. In this manner it is possible to achieve combustion with strong air excess and considerable reduction both of the unburnt hydrocarbons (HC) and the carbon monoxide (CO) produced.

Another advantage is that, even under the slowest running conditions, there are always large quantities of molecular oxygen in the exhaust gasses because the maximum possible quantity of air transits due to the absence of the throttling valve in the engine. This permits effective operation of the oxidizing catalysts usually installed in the exhaust pipes of this type of engine. The excessive air allows keeping low the nitrogen oxides ($NO_x$) produced by reducing peak combustion temperature.

Concerning 'cold' operating conditions, in the initial phases of engine operation in which the temperature of the internal walls of the head is near surrounding temperature it is necessary to pilot the injector in such a manner as to send more fuel (charge enrichment). In this manner the increased primary and secondary atomization caused by the greater quantity of fuel injected compensates for lack of vaporization of the fuel caused by impact with the 'hot' head wall to allow starting of the engine and its progressive heating. During the progressive heating of the engine detected with a sensor of known type and omitted for greater clarity, the control unit (10) will provide for progressive reduction of the greater quantity of fuel injected until steady state is reached. The position of the injector on the cylinder protects it from the high pressures and temperatures generated by combustion since in this phase the piston comes between the injector and the combustion chamber.

From the above description the following advantages can be deduced.

In practice, the present invention provides for adopting injectors designed for automobile engines for injection into the intake manifold. These injectors can easily be installed on the cylinder wall of small two-cycle engines and operate in a manner practically identical to their design conditions since they are used to spray fuel during the initial part of the compression stroke, so they introduce the fuel into a low-pressure environment in such a manner that all the injection pressure is used to provide energy to the jet. It is recalled that for the escape of a fluid from an orifice, even 'upstream-downstream' pressure is important and not only upstream (injection) pressure.

By positioning the injector on the cylinder walls, the important action of shielding the injector from pressure and temperature peaks reached during the combustion phase is realized. This phase is realized with the piston near top dead center so as to be in front of the fuel escape orifice, hence of the injector. This ensures longer duration and less carbonaceous combustion-residue fouling of the injector installed on the cylinder as compared with injectors or valves installed on the head.

The present invention adopts an injector and a mechanical gasoline pump to replace the carburetor. This replacement of components involves only a limited increase in production costs of the engine while making its adoption economically valid. It is clear that by means of direct injection, unburnt hydrocarbons in the exhaust caused by partial overlapping of the intake phase on the exhaust phase is greatly reduced.

Adoption of purely mechanical injection (low pressure injection of gasoline without the aid of compressed air) requires the adoption of a control unit capable of regulating the opening time of the injector (which is electromechanical, it being opened by an electrical impulse sent to a solenoid coil) and hence regulating the fuel injected. Regulation is based on the accelerator, controlled at the moment by the user, on engine speed, on temperature et cetera.

As regards the problem of lubrication, it is recalled that two-cycle engines usually are lubricated in operation. In practice the lubricant is mixed with the gasoline or introduced into the intake manifold by a measuring pump, then introduced into the dry crankcase which acts as a pump for the sucked air. By adopting direct injection, the gasoline does not traverse the crankcase, hence lubricating oil can no longer be added thereto and therefore the present invention provides input of oil directly into the intake manifold from which it penetrates into the crankcase. Since the crankcase is no longer 'scavenged' by the gasoline, a smaller amount of lubricating oil is required, i.e. approximately 50% less.

Naturally, numerous modifications, adaptations, variants, omissions and replacements of members by others functionally equivalent can be made to the above mentioned embodiments without departing from the scope of the following claims.

One of these variants could concern the lower input port of the duct (6) into the engine. Indeed, instead of being located in the cylinder head near the crankcase as shown in FIG. 1 it could be located in the crankcase itself without changing the operation of the engine.

The invention claimed is:

1. A two-cycle internal combustion engine comprising:
   one cylinder having a cylinder wall,
   one piston provided in said cylinder, said piston having an associated connecting rod for connection with a drive shaft and being movable in said cylinder between a bottom dead center position and a top dead center position so as to move through both a compression stroke and an expansion stroke,
   one head closing said cylinder on a combustion chamber side of said cylinder so as to form a combustion chamber in said cylinder between said head and said piston, said head having an internal surface,
   a crankcase closing said cylinder on a side of said cylinder opposite to said combustion chamber,
   a spark plug inserted in said head,
   a burnt gas exhaust pipe having an inlet port opening onto an internal surface of said cylinder adjacent the bottom dead center position of said piston,
   an air input duct that has no throttle valve and that has at least one combustion chamber air inlet scavenging port adjacent the bottom dead center position of said piston positioned so as to be opened and closed by movement of said piston,
   a lubrication oil inlet duct opening onto said air input duct,
   a sensor operable to sense rotation speed and angular position of the drive shaft,
   a fuel injector inserted in said cylinder wall, said fuel injector being inclined such that a fuel jet produced by said fuel injector is directed toward said interior surface of said head adjacent to said spark plug, penetrates into said combustion chamber and impacts said interior surface of said head adjacent to said spark plug, said fuel injector being positioned such that said top dead center position of said piston is between said fuel injector and said combustion chamber, and
   a control unit that synchronizes cyclic movement of said drive shaft with sparking timing of said spark plug and opening time of said fuel injector in dependence upon signals output from said sensor, and that regulates the quantity of fuel injected by said fuel injector for each engine cycle in dependence upon rotation speed, engine load and accelerator regulation set by a user, wherein the opening time of said fuel injector for each engine cycle is at the beginning of the compression stroke by said piston and after said piston has closed said at least one scavenging port.

2. The engine of claim 1, wherein said air input duct comprises a one-way valve designed to allow air flow in only one direction.

3. The engine of claim 2, wherein said crankcase is structured so as to operate as an air suction pump chamber by reciprocating movement of said piston in said cylinder.

4. The engine of claim 1, further comprising an engine temperature sensor, wherein said control unit regulates the quantity of fuel injected at each engine cycle in dependence on a temperature signal from said temperature sensor so as to increase the amount of fuel injected during initial operating phases when the engine has not yet reached running temperature.

5. The engine of claim 1, wherein said internal surface of said head is tapered and said spark plug is located in the center of said head.

6. The engine of claim 5, wherein said internal surface of said head is inclined at an angle of 33.1 degrees with respect to a plane perpendicular to the cylinder axis of said cylinder.

7. The engine of claim 6, wherein said injector is inclined at an angle of 32.5 degrees with respect to said plane.

* * * * *